Patented Jan. 30, 1934

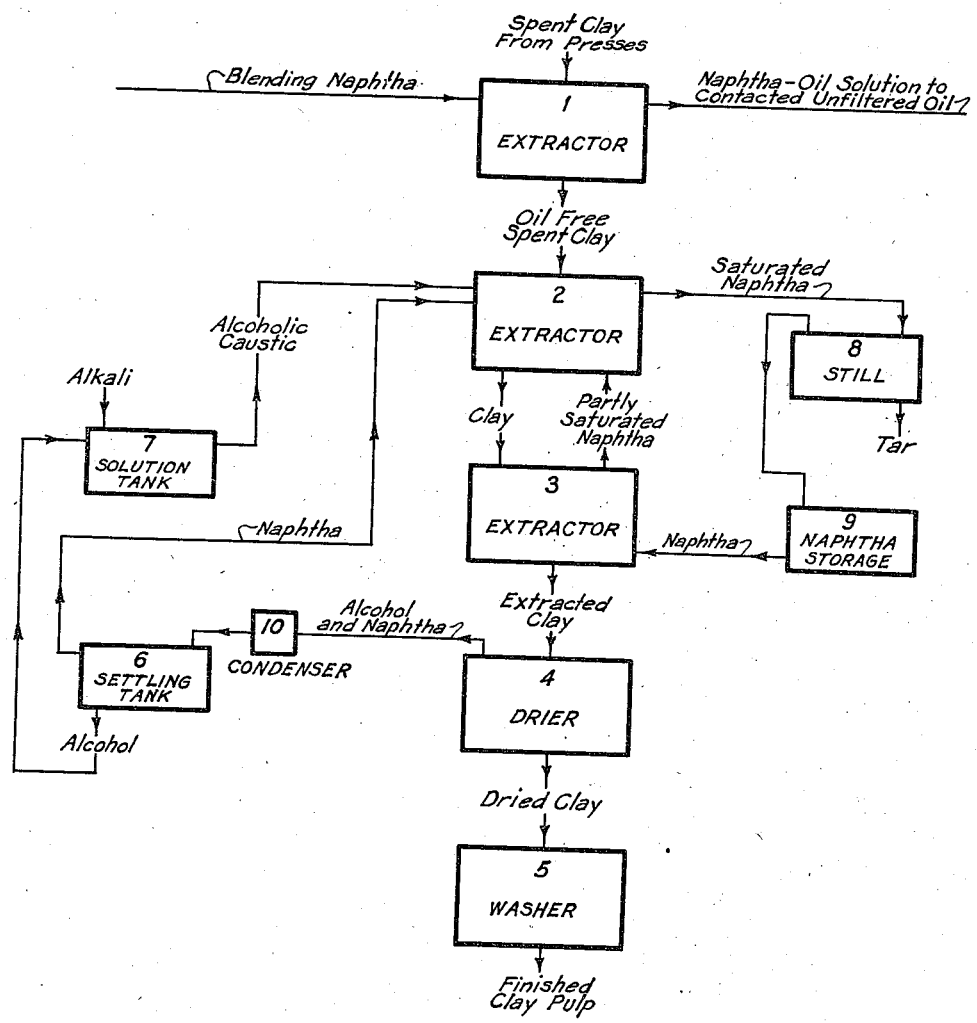

1,945,215

UNITED STATES PATENT OFFICE 1,945,215

REVIVIFICATION OF SPENT CLAYS

Albert E. Buell, Bartlesville, Okla., assignor to Phillips Petroleum Company, Bartlesville, Okla., a corporation of Delaware Application January 13, 1932. Serial No. 586,395

14 Claims. (Cl. 252—2)

The present invention relates, generically, to a novel method for the revivification of clarifying and decolorizing agents which have been used in treating oils. More particularly, the invention has especial relation to a process for revivifying highly active acid treated clays or hydrosilicates, of which "Palex" is mentioned by way of example, which have been used for the neutralization and decolorization of acid treated lubricating fractions of petroleum in the so-called "contact process". Such clays are usually referred to as "spent clay", and as removed from the filter presses after the cake has been washed with naphtha and blown with air, usually contain about 15% of oil, 10–15% of naphtha, and about 10% of coloring matter and other impurities removed from the treated oil.

A number of processes involving the use of various solvents, both alone and in mixtures, are known for the revivification of spent decolorizing agents, but it has been found that when these processes are practiced on acid treated clay which has been used to treat lubricating oil stocks that the reactivated clay does not approach the new clay in decolorizing efficiency. Apparently the solvents hitherto used are not capable of extracting all the coloring matter and other adsorbed impurities from the clay and thus its original active power is not regained.

The present invention, however, deals with a method, as described below, of reactivating this spent clay to new clay activity, and the reactivation can be accomplished repeatedly with negligible loss in the activity of the clay.

The primary purpose or object of the novel and improved method constituting the present invention, accordingly, is the revivification of spent clay, such as has been previously mentioned, in such manner that its original decolorizing, clarifying, and neutralizing power may be restored.

Among the other and incidental objects of the invention are the provision of a process, as aforedescribed, which is adapted to be intermittent or continuous in its operation, which is capable of being carried out in various suitable types of apparatus, in which recovery is made of the valuable oil otherwise discarded with the spent clay, and in which the solvents employed are adapted to repeated reuse.

The foregoing and other objects, which will be apparent from the following disclosure thereof, to those skilled in the art to which the present invention pertains, are attained by the exemplary embodiment of the invention described in detail hereinafter, are illustrated on the accompanying sheet of drawing, and are pointed out in the claims hereunto appended.

On the said sheet of drawing, one preferred and typical method of carrying out this invention is illustrated in diagrammatic manner.

As illustrated, the first step of the process consists in removing the adhering oil from the spent clay by washing the latter with a suitable solvent while agitating in a suitable extractor 1. While removal of this oil in a separate preliminary step is not necessary as far as reactivation of the clay is concerned, it is obviously desirable, since each ton of spent clay contains about a barrel of oil which is ordinarily lighter in color and more color stable than the treated oil. The oil solvent preferably used for this purpose is naphtha, although other solvents which will not by themselves remove coloring matter from the clay may be utilized if desired.

As shown on the accompanying flow sheet, it is sometimes convenient to use, as an oil solvent, naphtha which is subsequently used as a diluent for the contacted oil before filtration. It is not essential to remove all of the oil solvent from the clay at the conclusion of this step, as will be apparent from the description of the next step.

The practically oil free clay is then subjected to the second step in the process, represented by extractor 2 on the flow sheet. This step consists in agitating the clay with a color solvent composed of a mixture of petroleum naphtha and an alcoholic solution of an alkali hydroxide.

The alkaline solution is prepared by dissolving about one-half pound of sodium or potassium hydroxide in one gallon of methyl or ethyl alcohol. Other alcohols are less desirable solvents due to the more ready solubility of the alkali hydroxides in the two alcohols mentioned.

While the exact nature of the chemical or physical action of the alkaline alcoholic solution on the spent clay is not known, it is believed that the solution, which is strongly adsorbed by the clay, neutralizes the colored acidic bodies held within the pores of the clay and thus makes them soluble in the naphtha. In effect, the alcoholic solution replaces the colored matter in the clay, and it is retained by the clay during the washing operations in which the displaced colored bodies are dissolved in the naphtha. The clay when wet with the alcoholic caustic solution has no adsorptive power for the colored bodies.

When alcohol is used without the alkaline hydroxide only a part of the colored bodies can be washed from the clay. In no case have I been able to restore the activity to more than 50% when using alcohol and naphtha without the alkaline hydroxide in quantities of the same order required when using alcoholic caustic. Likewise, when aqueous alkali is used instead of an alcoholic solution, the activity of the clay is extremely low and the clay cannot be used again. Moreover, when the alcohol and alkali hydroxide are used simultaneously the clay is restored to 100% activity and can be used over and over again, i. e., reactivated an indeterminate number of times. Other hydrocarbon solvents may be used in place of the naphtha if desired; naphtha is preferred because of its preferable use in the first step of the process, its low miscibility with alcohol, its availability, and because its boiling range may be adjusted to avoid losses and facilitate recovery.

This (second) step of the process is preferably carried out by suspending the clay in a fairly large volume of naphtha, for example, 500 gallons per ton of spent clay. The alcoholic caustic, used in the proportion of 100–175 gallons per ton of spent clay, is added to the suspension while agitating the mixture. The agitation is usually carried on at ordinary temperatures, but higher temperatures, for example, 125° F., may sometimes give improved results. Agitation is continued until the bulk of the impurities contained in the clay are removed and dissolved in the naphtha. The naphtha is then removed from the clay, by filtration or decantation, and is distilled to separate it from the dissolved impurities. (Flow sheet-still 8.) This recovered naphtha may contain very small amounts of alcohol, but separation is unnecessary as it is immediately put back into the system.

In the third step of the process, residual colored matter is washed from the clay with fresh naphtha. Two or more of these washes carried out, on the flow sheet, in extractor 3 are required. 200–300 gallons of naphtha per ton of spent clay are used for each rinse, making the total volume of naphtha used from 1,000–1,500 gallons per ton. Naphtha used in final rinses of step 3 contains only a small amount of colored matter and may be used again in step 2 without redistillation, that is, the washing may be a countercurrent procedure.

It is to be noted, that for batch operation, extractors 1, 2 and 3, as shown on the flow sheet, may represent only a single piece of equipment used in three steps.

In the next and fourth step of the process, the clay is dried to recover the alcohol added in step 2 and the remaining naphtha which was not removed by filtration or decantation. This is accomplished by heating the clay in a suitable type of drier, 4, to a moderate temperature, preferably less than 400° F. It has been found that prolonged heating or the use of excessive temperatures in the drying operation will produce a loss in activity of the clay. This effect seems to be mainly due to the presence of free alkali, and although it may be partially or wholly overcome by proper procedure in the next operation of the process, it is desirable to dry the clay in an apparatus which will permit rapid recovery of the solvents at minimum temperatures.

The expelled alcohol and naphtha vapors are condensed together in condenser 10, and the liquids separated by taking advantage of their low mutual solubility, in settling tank 6. The recovered naphtha is returned to extractor 2, and the alcohol to solution tank 7 in which it is again used to make alcoholic caustic of the desired concentration.

In step 5 of the process, the purpose of which is to remove the alkali remaining in the clay, the clay is washed with water, treated with dilute acid, and again washed with water, in washer 5. Sulfuric acid in the amount of 5 to 15% by weight of the clay is applied in approximately 5% solution. Heating the clay in the presence of the acid sometimes has a detrimental effect, therefore, the acid treatment is carried out by agitation at ordinary temperatures, rather than by cooking as in the case of raw clay. The maximum quantity of acid mentioned above is necessary only when the clay has been subjected to excessive temperatures or too long a drying period during removal of the alcohol in the previous step. The clay may be left slightly acid after the final water wash if desired.

The clay is now ready for re-use in pulp form, or if desired, it may be dried and used in powder form. In either case, the clay is capable of being revivified, in this manner, an indefinite number of times.

An example of the results obtained by the method described is given below.

Spent Palex clay which had been used to neutralize and decolorize a Mid-Continent acid treated long residuum, was washed with naphtha to remove the retained oil, extracted with a color solvent composed of a mixture of 100 gallons of methanol containing 0.45 pounds per gallon of sodium hydroxide, and 600 gallons of naphtha (per ton of clay), then rinsed four times with 200 gallons per ton portions of naphtha. The clay was then dried, washed with water, treated with 10% by weight of sulfuric acid in 5% solution, and again washed with water.

To determine the efficiency of this revivified clay, portions of an acid treated long residuum were contacted, respectively, with 25 pounds per barrel of unused Palex clay and 25 pounds per barrel of the revivified clay.

The two resulting bright stocks each had a color of about 5½ N. P. A., the oil treated with revivified clay being slightly lighter than the other.

To show the difference in activity effected by the use of alcoholic caustic instead of plain alcohol, a portion of the spent clay referred to in the above example was treated simultaneously, identically in all respects except that 125 gallons per ton of plain methanol was substituted for the alkaline methanol solution, and a third portion of the same acid treated oil contacted, with 50 pounds per barrel, of this clay. The contacted oil had a color of about 6 N. P. A. Thus, the efficiency of the clay treated with plain alcohol was less than 50%, as compared to slightly more than 100% for the clay treated according to the method disclosed.

While one method of putting the present invention into practice has been described in some detail, it is not thereby intended to limit the scope of the invention otherwise than by the terms of the appended claims.

What I claim and desire to secure by Letters Patent is:

1. A method of treating clay which has been used in the decolorization and neutralization of petroleum fractions in the contact process comprising removing coloring matter from said clay by suspending the latter in an excess of naphtha in the presence of a strong solution of an alkali in an alcohol, and removing the color-bearing naphtha therefrom.

2. The process of reactivating spent clay used for decolorizing and clarifying lubricating oils which comprises agitating the clay with an oil solvent, separating said solvent from the clay, agitating the oil free clay with a mixture of naphtha and an alcoholic solution of sodium hydroxide, and separating the clay from said mixture.

3. A method of revivification of spent contact clay which includes applying thereto a solution of an alkali in an alcohol in the presence of large quantities of naphtha while agitating the clay, removing the color-bearing naphtha, drying the clay to remove the solvent for the alkali and residual naphtha, neutralizing the alkali with a weak acid solution, and washing out the resultant salts.

4. The method of treating clay which has been used in the contact process which comprises removing the colored matter therefrom by dissolving said colored matter in naphtha in the presence of a strong alcoholic solution of sodium hydroxide, removing the colored matter-naphtha solution, distilling the alcohol, neutralizing the base, and washing out the resultant salt.

5. The method of revivifying spent clay used in filtering petroleum products which includes agitating the oil free clay in a color solvent comprising a strong alcoholic caustic solution, removing the color portion of said solvent, and recovering the remaining portions of said color solvent.

6. The method of treating filtering material, such as contact clay, which comprises subjecting it to the action of a color solvent consisting of naphtha and an alcoholic caustic solution.

7. A method of revivifying spent clay comprising extracting the clay with a hydrocarbon solvent in the presence of a strong alcoholic solution of an alkali.

8. The process of reactivating spent clay which includes treating the clay with a solvent of the coloring matter adsorbed by said clay, said solvent being composed substantially of a hydrocarbon solvent and alcoholic caustic soda.

9. A method of reactivating spent contact clay to substantially new clay activity comprising displacing the coloring matter thereof by means of a strong alkaline alcoholic solution in the presence of a hydrocarbon solvent.

10. A color solvent for use in revivifying spent contact clay comprising naphtha and alcoholic caustic.

11. A color solvent for use in revivifying spent contact clay comprising a relatively large percentage of naphtha and a relatively small percentage of alcoholic caustic.

12. A color solvent for use in reactivating spent contact clay comprising naphtha and alcoholic caustic soda in the proportion of about 600 gallons of naphtha per ton of clay and about 100–200 gallons of alcoholic caustic soda solution per ton of clay, said alcoholic caustic soda solution containing abut 0.5 lb. of NaOH per gallon.

13. A method of revivifying clay which has been used in the treatment of lubricating oil stocks, which comprises applying an alkali hydroxide dissolved in an alcoholic solvent to the clay in the presence of an organic solvent for impurities removed from the clay as a result of said application, separating the clay from the impurity bearing liquids, and subsequently treating the separated clay with an aqueous solvent for alkali.

14. A color solvent for use in revivifying spent contact clay, having the color solvent characteristics of naphtha mixed with an alcoholic caustic.

ALBERT E. BUELL.